United States Patent [19]

Hollaender, II et al.

[11] Patent Number: 4,540,307

[45] Date of Patent: Sep. 10, 1985

[54] FITTING FOR STRUCTURAL PIPE

[75] Inventors: Robert P. Hollaender, II, Cincinnati; Leslie M. Howard, Batavia, both of Ohio; Ernest A. Hund, Ft. Thomas, Ky.

[73] Assignee: The Hollaender Manufacturing Co., Cincinnati, Ohio

[21] Appl. No.: 616,270

[22] Filed: Jun. 1, 1984

[51] Int. Cl.³ .............................................. F16B 7/00
[52] U.S. Cl. .................................. 403/190; 403/234
[58] Field of Search ............... 403/297, 190, 191, 233, 403/234, 330

[56] References Cited

U.S. PATENT DOCUMENTS

| 693,159 | 2/1902 | Rumbarger | 403/322 X |
|---|---|---|---|
| 2,238,561 | 4/1941 | Goodyear | |
| 3,000,656 | 9/1961 | Hollaender | |
| 3,441,253 | 4/1969 | Blum et al. | |
| 3,514,135 | 5/1970 | Cooper | |
| 4,146,341 | 3/1979 | Smith | 403/297 X |
| 4,344,719 | 8/1982 | Thom | |
| 4,406,560 | 9/1983 | Pickering | |

FOREIGN PATENT DOCUMENTS

| 2403832 | 8/1975 | Fed. Rep. of Germany | |
|---|---|---|---|
| 2006379 | 5/1979 | United Kingdom | 403/297 |

*Primary Examiner*—Andrew V. Kundrat
*Attorney, Agent, or Firm*—Wood, Herron & Evans

[57] ABSTRACT

A fitting having a body provided with a pair of generally parallel, spaced arms extending therefrom, each having one of a pair of confronting camming surfaces thereon, a locking element located between the arms and mounted for pivotal motion about an axis perpendicular to the arms, and means accessible exteriorly of the fitting body for selectively pivoting the locking element to a position between the arms for engagement with the confronting camming surfaces thereof to urge the arms outwardly for interiorly gripping a hollow pipe into which the arms have been inserted.

12 Claims, 3 Drawing Figures

FITTING FOR STRUCTURAL PIPE

This invention relates to unthreaded, slip-on pipe connectors, and more particularly to such pipe connectors which grasp the interior of the pipe thereby concealing the pipe-grasping elements of the fitting.

Unthreaded, or slip-on, fittings for connecting lengths of structural pipe have existed for a number of years. Typically, the slip-on type fitting is distinguished from a conventional pipe fitting in that the former does not require the end of the pipe to be externally threaded, whereas conventional pipe fittings do. Threaded pipe is expensive and time-consuming from both the standpoint of the expense needed to provide the threads on the pipe, as well as the time needed to thread the pipe into the fitting to establish a connection. By way of contrast, with slip-on pipe fittings, it is only necessary to insert the unthreaded end of the pipe into an opening in the fitting, and tighten a set screw provided in the walls of the fitting which engages the exterior of the pipe, preventing withdrawal.

With many typical slip-on fittings heretofore known in the art, in which the unthreaded end of the pipe is inserted into an opening in the fitting (female-type fitting), it is not possible to have a smooth continuous joint where the exterior surfaces of the pipe and fitting meet. This has detracted from its appearance. While this unattractiveness may not be important in some applications, it is aestheticly undesirable for decorative railings, furniture and similar structures where appearance is important.

Some fittings have been provided with arms adapted to be received into the pipe (male-type fitting) rather than vice versa. Some typical male connectors, such as are disclosed in U.S. Pat. Nos. 4,406,560; 4,146,341; and 2,238,561, employ arms extending from a body designed to form a substantially uninterrupted surface between the pipe exterior and the body when the pipe is placed onto the arms. Those fittings also employ means to spread the arms apart to grasp the pipe wall. Such prior art fittings overcome the unattractiveness problem encountered by the female-type fittings, but they suffer reliability and other problems such as insufficient or improper grasp pressure between the arms and the pipe wall, excess number of moving parts, and the like, which detract from their overall desirability. For example, in the fitting disclosed in U.S. Pat. No. 4,146,341, grasp of the pipe is made at two points thereby causing undue pressure at those points. That undue pressure can deform the pipe reducing its attractiveness and usefulness. The fittings disclosed in U.S. Pat. Nos. 4,406,560 and 2,238,561 provide more uniform pressure against the pipe interior wall, but do not have enough mechanical advantage between the actuating mechanism causing the arms to spread and the arms themselves to provide an effective grasp. In some instances, the grasp may be so minimal as to allow the fitting to become dislodged from the pipe under slight forces such as are encountered when a person leans against a railing.

Accordingly, it has been an objective of this invention to provide an inexpensive, reliable and aesthetically pleasing fitting of the male slip-on type for connecting lengths of structural pipe to each other and/or to a structural member, such as, a wall or floor or a vertical fence post. This objective has been accomplished by a fitting having a body provided with a pair of generally parallel, spaced arms extending therefrom, each having one of a pair of confronting camming surfaces thereon, a locking element located between the arms and mounted for pivotal motion about an axis perpendicular to the arms, and means accessible exteriorly of the fitting body for selectively pivoting the locking element to a position between the arms for engagement with the confronting camming surfaces thereof to urge the arms outwardly for interiorly gripping a hollow pipe into which the arms have been inserted.

In a preferred embodiment of the invention, there is provided a fitting having a pair of spreadable parallel arms extending from the body thereof which collectively have an exterior surface configured to slidingly fit within the bore of the structural pipe to which the fitting is to be connected. The arms are spaced apart to form a slot therebetween which communicates with an open recess formed in the fitting body at the base, or inner end of the arms. The arms are provided with oppositely sloped confronting camming surfaces at the terminal ends thereof. A locking element located between the arms and pivotally mounted on a transverse shoulder spanning the arms has a pair of camming surfaces positioned between the camming surfaces of the arms and shaped to fittingly mate the arm camming surfaces such that, when the locking element pivots, the locking arm camming surfaces engage the camming surfaces on the arms to spread the arms apart, causing substantially the entire periphery of the arms to grasp the interior wall of a structural pipe positioned over the arms. To pivot the locking element, a set screw threadably engaged in a hole in the wall of the fitting is provided. The outer and inner ends of the set screw communicate with the fitting exterior and the recess formed in the fitting body at the base of the arms, respectively. By advancing the set screw, the locking element pivots causing the camming surfaces to engage and spread the arms apart whereby the periphery of the arms grasp the interior of the pipe which is disposed over the arms of the fitting. Conversely, when the set screw is retracted, the element could pivot out of camming engagement allowing the arms to move together, thereby releasing the grasp on the pipe.

One advantage of the fitting of this invention is that it requires a minimum number of parts, namely, the body with the integral arms and spanning shoulder, a set screw, and a pivotal locking element. A further advantage is that, except for the set screw, all elements of the locking assembly are concealed when the fitting and pipe are connected. Hence, its attractiveness from an aesthetic standpoint is enhanced. Finally, since the pipe is securely gripped on its interior by substantially the complete periphery of the arms and those arms are maintained in spread relationship by a perpendicular transversely pivoting locking element which has been pivoted by a jack-screw type mechanism, greater mechanical advantage providing greater grasp force is obtained than heretofore achieved without deforming the pipe.

These and other features, objectives, and advantages of the invention will become more readily apparent from a detailed description thereof taken in conjunction with the drawings in which.

Figure 1:
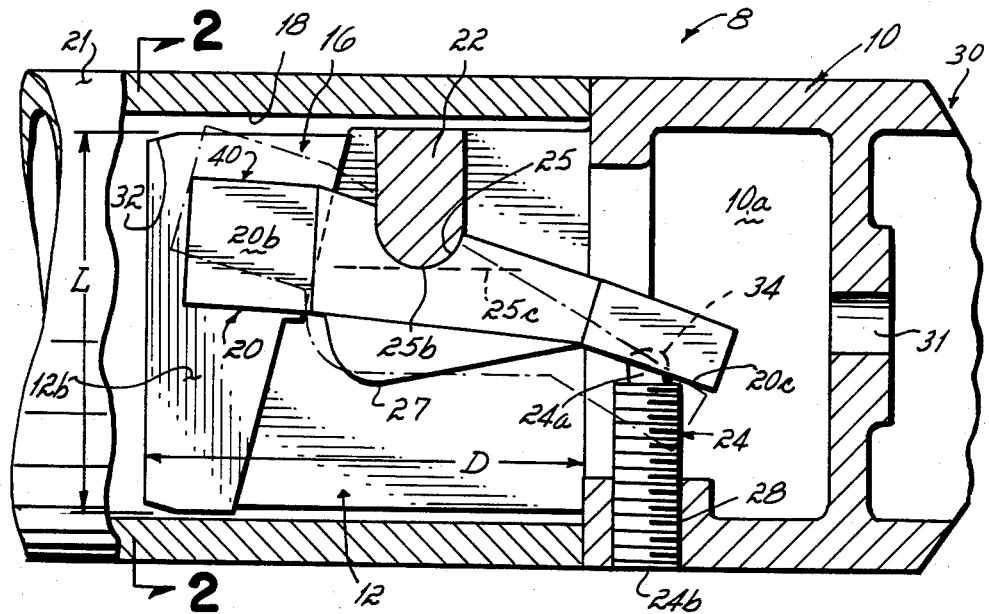
FIG. 1 is a side elevational view, partially in cross-section, showing a preferred embodiment of the fitting of the present invention shown inserted into a structural pipe.

The concealed fitting 8 of this invention includes a body 10 from which extends a pair of parallel arms 12 and 14 which are spaced apart to define therebetween slot 16. The outer peripheral surfaces 12a and 14a of the arms 12 and 14, respectively, are configured to slidingly fit within the open internal cavity 18 of a structural pipe 21. Typically, the structural pipe 21 has a circular cross-section in which case the peripheral outer surfaces 12a and 14a of the arms 12 and 14 collectively define a cylinder which snugly fits within the inner cylindrical surface of the cavity 18 when the structural pipe is positioned over the arms for connection to the fitting. Were the structural pipe 21 to have a square cross-section, the outer peripheral surfaces 12a and 14a of the arms 12 and 14 would preferably be configured to collectively provide tha arms with a square cross-section for snugly fitting within the open internal cavity 18 of the pipe. Obviously, other cross-sections can be used.

To releasably secure the structural pipe 21 to the fitting 8 when the arms 12 and 14 are inserted in the pipe cavity 18, a unitary locking element 20 and an actuator 24 are provided. The locking element 20 is positioned between the arms 12 and 14 and is pivotally mounted on a shoulder 22 which spans slot 16 and is formed integral to arms 12 and 14. Shoulder 22 is preferably cut as at 22a so that it does not impede spreading of arms 12 and 14 as will be discussed. Locking element 20 preferably is provided with a shoulder mating recess 25 which permits element 20 to rest on shoulder 22 for pivotal motion thereon. Shoulder 22 is positioned closer to body 10 of fitting 8 than to the terminal ends 32 of arms 12 and 14. Preferably, shoulder 22 is positioned approximately one-third the distance D from the body 10 to terminal ends 32 of arms 12 and 14. Further, shoulder 22 extends into slot 16 approximately one-third the length L of slot 16. That placement coupled with the extension of a surface 20c into body 10 as discussed below, provides a mechanical advantage useful to this invention although not itself necessary. The shoulder placement provides a fulcrum about which the elongated element 20 pivots such that there is an approximate 2:1 mechanical advantage. The shoulder placement also assists in holding locking element 20 in slot 16 once inserted as will be discussed hereafter. Alternatively, shoulder 22 could be replaced with a transverse pin (not shown) which passes through coaxial holes (not shown) formed in the arms 12 and 14 and in the locking element 20 such as is described in U.S. Pat. No. 4,146,341 at column 2, lines 36-41, which is hereby incorporated by reference.

The terminal ends 32 of arms 12 and 14 are provided with oppositely sloped camming surfaces 12b and 14b, respectively. Surfaces 12b and 14b are preferably inclined at about 5° from a vertical axis shown in dotted line in FIG. 2. The unitary locking element 20 is provided with a cam pad 40 which has on opposite sides thereof a pair of mating sloped camming surfaces 20a and 20b. As will be apparant from the drawings, cam pad 40 is positioned between camming surfaces 12b and 14b. Further, camming surfaces 20a and 20b are shaped to fittingly mate with the pair of camming surfaces 12b and 14b, respectively. It has been discovered that the 5° tilt to each camming surface provides an optimum of approximately a 10:1 mechanical advantage when spreading arms 12 and 14.

Figure 2:
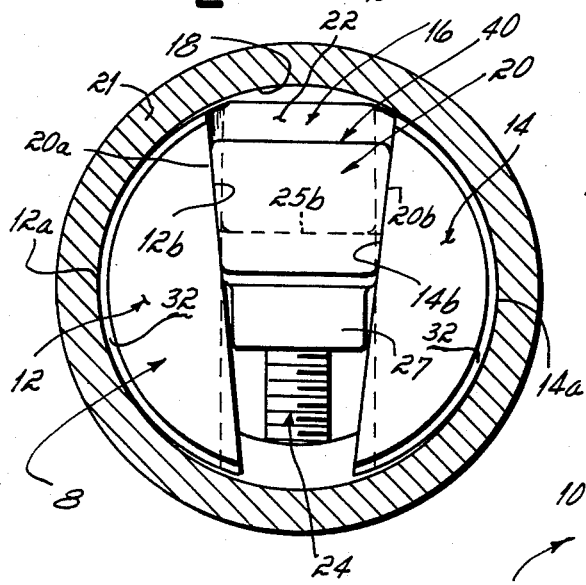
FIG. 2 is a cross-sectional view of the fitting of FIG. 1 taken along line 2—2 of FIG. 1.
Figure 3:
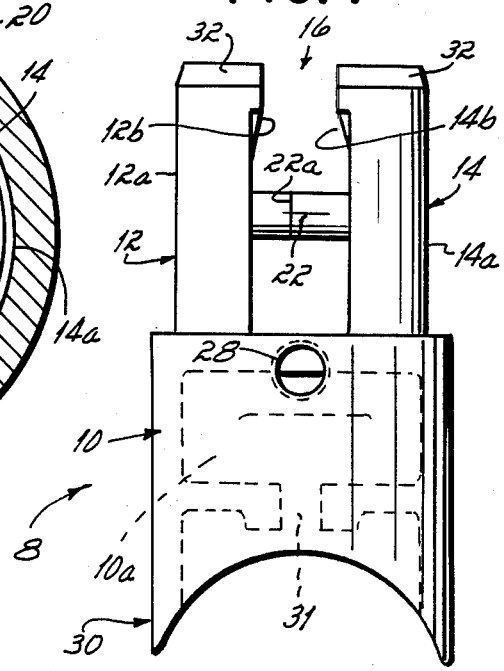
FIG. 3 is a bottom view of the fitting of FIG. 1 with the locking element removed.

Locking element 20 is moveable between a locking position and an unlocking position, shown in solid and phantom lines, respectively, in FIGS. 1 and 2, when the unitary locking element 20 pivots in counterclockwise and clockwise directions, respectively. In the locking position shown in solid lines in FIG. 1, camming surfaces 20a and 20b have engaged camming surfaces 12b and 14b on arms 12 and 14 to spread the arms apart. In the unlocked position shown in phantom lines in FIG. 1, substantially the entire camming surfaces 20a and 20b of the unitary locking element 20 are positioned above an imaginary plane 25c spatially coincident with the bottom 25b of shoulder 22 such that the surfaces 20a and 20b no longer engage camming surfaces 12b and 14b of arms 12 and 14 with sufficient force to cause the arms to spread apart. But as will be apparent from FIG. 2, the camming surfaces 12b, 14b, and 20a, 20b, respectively, come into engagement before a substantial portion of camming surfaces 20a, 20b pass through imaginary plane 25c as element 20 pivots counterclockwise.

Locking element 20 further includes an actuator mating surface 20c which projects into a recess 10a formed in the fitting body 10 which communicates with the slot 16 at the inner ends, or base, of arms 12 and 14. The surface 20c of the unitary locking element 20 is moveable between inner and outer positions shown in solid and phantom lines, respectively, in FIG. 1, which correspond to the locking and unlocking positions, respectively, of camming surfaces 20a and 20b. Locking element 20 is also preferably provided with an extra surface 27 which provides strength over recess 25 so that element 20 does not bend or break in use.

The actuator 24, in a preferred form, is a set screw which is threadably engaged in a radially disposed through hole 28 formed in the wall of the fitting body 10. The through hole 28 at its inner and outer ends communicates with the body recess 10a and the exterior of the body 10, respectively. The actuator set screw 24 has an inner end 24a which engages the surface 20c. In some instances, such as where element 20 is a cast of aluminum, a recess 34 will be formed in surface 20c due to the pressure exerted on surface 20c by end 24a of srew 24. When the screw 24 is rotated in a locking direction advancing it axially inwardly, the unitary locking element 20 pivots in a counterclockwise direction in turn moving the camming surfaces 20a and 20b into spreading engagement with the mating camming surfaces 12b and 14b of arms 12 and 14. When arms 12 and 14 are spread apart by the action of the unitary locking element 20, substantially the entire peripheries 12a and 14a of the arms grasp the structural pipe 21 about its internal cavity 18 as shown in FIG. 2. Screw 24 forms a jack-screw structure which also provides roughly a 10:1 mechanical advantage.

The fitting of the present invention has a roughly 200:1 total mechanical advantages which arises from the product of the mechanical advantages of the jack-screw action of acutator 24, lever action of element 20, and camming surfaces 12a, 14b, 20a, and 20b, as heretofore discussed. That large mechanical advantage provides a strong, reliable grasp on the interior of the pipe 21. It is important to recognize, however, that the force obtained through the roughly 200:1 mechanical advantage is spread out over a large area rather than concentrated bacause the area of contact over which force is applied is substantial (i.e., substantially the entire periphery 12a and 14a of the arms). Hence, the force per unit area at any given point on the pipe wall exerted by the arms is not sufficient to noticeably deform pipe 21.

To remove fitting 8 from pipe 21, the set screw 24 is retracted by rotating about its longitudinal axis in an unlocking direction. Arms 12 and 14 have not been spread beyond their elastic limit and will thus tend to move toward each other. However, due to frictional forces, cam pad 40 is retained in its locked position thereby preventing arms 12 and 14 from releasing their grasp on pipe 21. Accordingly, even after screw 24 is retracted, fitting 8 will typically have to be forced out of pipe 21. A screwdriver, an allen wrench or the like can be used to rotatably engage appropriately configured outer end 24b of the set screw actuator 24 to advance and retract it.

Body 10 and arms 12 and 14 are preferably made of aluminum. Locking element 20 can be, as stated earlier, cast of aluminum. An equally desirable alternative is to make element 20 by well-known sintering techniques into a copper/steel element. A sintered copper/steel element can be made with greater dimensional accuracy than can a cast aluminum piece. Moreover, the hard copper/steel locking element 20 and the soft aluminum camming surface 12b and 14b provide greater efficiency of the wedging action as opposed to an aluminum to aluminum wedge. Thus, the sintered element, because of reduced frictional losses, provides an effective mechanical advantage of the camming surfaces which is greater than that obtained with an aluminum locking element.

The body 10 of the fitting 8 is preferably provided with a forward extension 30 of body 10 which is curved and recessed and adapted to abut and extend partially along the circumference of a pipe (not shown) similar to structural pipe 21. Connection about the circumference of a structural pipe (not shown) like 21 can be made by conventional means, preferably by a screw (not shown) inserted in recess 10a of body 10 and screwed through hole 31 and into the wall (not shown) of the pipe (not shown). Alternatively, extension 30 could be replaced with one or more assemblies similar to arms 12 and 14, pivotal unitary locking element 20, and actuator 24 previously described, if the fitting is a coupler, a tee, an elbow, or the like. Alternatively, extension 30 could take the form of a flange (not shown) which can be bolted to a floor or wall to anchor a length of pipe forming part of a railing, shelf support or the like.

Significantly, with the concealed fitting of this invention, when a pipe 21 is secured to the fitting body 10, the unitary locking element 20 is completely concealed. In fact, when a pipe 21 is secured to the fitting body 10, the only element of the pipe clamping assembly which is not concealed is the actuator 24. Since the actuator 24, in a preferred form, is simply a set screw, that portion of the clamping assembly which is visually exposed, namely, the set screw, is relatively unobtrusive and detracts little from the overall appearance of the fitting.

Additionally, by reason of the fact that the unitary locking element has a surface 20c which extends into the body 10 of the fitting, the set screw 24 can be located in the fitting body at a point such that it is fully accessible when structural pipe 21 is fitted over arms 12 and 14.

Also important is the fact that the unitary locking element 20 is perpendicular to camming surfaces 12b and 14b. Hence, when camming surfaces 20a and 20b apply a wedging force against camming surfaces 12b and 14b, the force is uniformly distributed and with greater grasping force than heretofore achieved. Since arms 12, 14 are not deformed beyond their elastic limit (i.e., not plastically deformed), the arms tend to return to their normal undeformed position, thus exerting inward forces on locking element 20. The camming surfaces and inward force of the arms 12, 14 cooperate to urge element 20 clockwise, causing surface 20c to bear against actuator 24. In that manner, the entire assembly is locked into position, thereby minimizing the likelihood of coming loose over time due to such forces as vibration.

Another important aspect of the pipe connector of this invention is the ease of assembly and use. By merely inserting surface 20c of locking element 20 towards and into recess 10a of body 10 such that locking element 20 rests with its shoulder mating recess 25 on shoulder 22, and inserting actuator screw 24 into body 10, locking element 20 will be held at sufficient points that it cannot be wedged in such a manner as to be easily removed from pivotal engagement with shoulder 22. Further, because shoulder 22 is positioned as discussed earlier, set screw 24 can be rotated in the locking direction to engage surface 20c, thereby "locking" element 20 in the fitting while not yet causing surfaces 20a and 20b to have come into spreading engagement with surfaces 12b and 14b.

Another important advantage of this invention is the relatively few number of individual parts which are necessary. Preferably, the body 10, arms 12 and 14, and shoulder 22 are integrally formed in a single casting by well known means. Further, in the preferred embodiment, the only additional elements are the set screw 24 and the pivotal locking element 20. The locking element 20 can also be formed in a single casting. The only added labor is cutting shoulder 22 as at 22a, using known techniques to turn body 10 to provide the appropriate outer diameter and remove any fillet (not shown) between body 10 and arms 12 and 14, and tapping hole 28. Accordingly, the concealed fitting of this invention can be constructed relatively easily with readily available equipment from a simple pair of machine castings and readily available set screws.

Finally, and an equally important advantage of this invention, is that it is useful in joining standard commercially available structural pipe which need not be threaded internally or externally. Of course, the pipe fitting as well as the structural pipe can be disassembled and subsequently reused.

What is claimed is:

1. A fitting comprising:
   a body;
   a pair of generally parallel, spaced arms extending from said body;
   a pair of confronting camming surfaces, each said arm including a respective one of said camming surfaces thereon;
   a locking element located between said arms and mounted for pivotal motion about an axis perpendicular to said arms; and
   actuator means accessible exteriorly of said body for selectively pivoting said locking element to a position between said arms for engagement with said confronting camming surfaces thereof to urge said arms outwardly for interiorly gripping a hollow pipe into which said arms have been inserted.

2. The fitting of claim 1, said locking element having an end located between said arms and an opposite end; and
   said actuator means being a screw located to engage said opposite end.

3. A concealed fitting for connection to a structural pipe having an open internal cavity at its end, comprising:
- a body having securement means associated therewith to facilitate securing said body to a structural member, said body having a recess therein communicating with the exterior of said body;
- a pair of spreadable parallel arms extending outwardly from said body on opposite sides of said recess, said arms having outer peripheral surfaces configured to collectively slidingly fit within said open internal cavity of a first structural pipe to which said fitting is to be connected, said arms being spaced from each other to define a slot therebetween connecting with said recess, said arms further including a first pair of confronting camming surface portions;
- a unitary locking element located in said slot between said arms;
- transverse mounting means spanning said slot for pivotally mounting said locking element;
- said locking element having a second pair of camming surface portions positioned between said first pair of camming surface portions, said second pair of camming surface portions being shaped to fittingly mate with said first pair of camming surface portions;
- said locking element having an actuator-mating surface located within said recess; and
- an actuator moveable in locking and unlocking directions having an inner end extending into said recess and an outer end accessible exteriorly of said body when said arms are positioned within said open internal cavity of a structural pipe, said actuator inner end engaging said actuator-mating surface of said locking element for pivoting, when said outer end of said actuator is moved in said locking direction, said locking element camming surface portions to a locking position wherein said second pair of camming surface portions engage said first pair of camming surface portions to spread said arms apart whereby substantially the entire of said peripheries of said arms grasp the interior wall of said first structural pipe about said internal cavity to prevent removal of said arms from said first structural pipe, said actuator inner end permitting said locking element camming surface portions to move to an unlocking position wherein said second pair of camming surfaces move out of engagement with said first pair of camming surface portions when said actuator outer end is moved in said unlocking direction, whereby said arms are removeable from said first structural pipe internal cavity.

4. The fitting of claim 3 wherein said outer peripheral surfaces of said arms collectively form a cylinder for snugly engaging the interior cylindrical wall of a structural pipe, and wherein said actuator is a screw having a longitudinal axis, said screw being threaded into a threaded through hole radially disposed in said body at a point accessible from the exterior thereof when said arms are engaged in said open internal cavity of a structural pipe, said locking and unlocking directions being opposite rotational directions relative to the longitudinal axis of said screw.

5. The fitting of claim 4 wherein said structural member is a second structural pipe, said securement means having a curved, recessed end adapted to abut and extend partially around the circumference of said second structural pipe.

6. The fitting of claim 5, said arms having terminal ends, and said first pair of camming surfaces portions being positioned at said terminal ends.

7. The fitting of claim 6, said first pair of camming surface portions being oppositely sloped, each said first camming surfaces being inclined at about a 5° angle to a vertical axis, and wherein each said portion of said second pair of camming surface portions is mutually sloped with its respective mating portion of said first pair of camming surface portions.

8. The fitting of claim 6 wherein said transverse mounting means includes a shoulder having a bottom integrally formed with at least one of said arms and said transverse mounting means further includes a recess in said locking element mated to pivotally rest on said shoulder bottom.

9. The fitting of claim 6 wherein said transverse mounting means includes a pin passing through coaxial apertures formed in said locking element and arms.

10. The fitting of claim 8 wherein said shoulder is positioned closer to said body than said terminal ends and extends into said slot approximately one-third the length of said slot whereby said pairs of camming surface portions spreadingly engage before a substantial part of said second pair of camming surface portions have passed through an imaginary plane spatially coincident with said bottom of said shoulder.

11. A concealed fitting for connection to a structural pipe having an open internal cavity at its end, comprising:
- a body having securement means associated therewith to facilitate securing said body to a structural member, said body having a recess therein communicating with the exterior of said body;
- a pair of spreadable parallel arms extending outwardly from said body on opposite sides of said recess, said arms having outer peripheral surfaces configured to collectively slidingly fit within said open internal cavity of a first structural pipe to which said fitting is to be connected, said arms being spaced from each other to define a slot therebetween connecting with said recess, said arms further including a first pair of confronting camming surface portions;
- a unitary locking element located in said slot between said arms;
- transverse mounting means spanning said slot for pivotally mounting said locking element;
- said locking element having a second pair of camming surface portions positioned between said first pair of camming surface portions, said second pair of camming surface portions being shaped to fittingly mate with said first pair of camming surface portions;
- said locking element having an actuator-mating surface located within said recess; and
- movable means engageable with said actuator-mating surface accessible exteriorly of said fitting body for pivoting said locking element to cause said second pair of camming surfaces to slidingly engage said first pair of camming surfaces and thereby spread said arms to interiorly grip said pipe encircling said arms.

12. The fitting of claim 11, said movable means being a screw.

* * * * *

UNITED STATES PATENT AND TRADEMARK OFFICE
CERTIFICATE OF CORRECTION

PATENT NO. : 4,540,307

DATED : September 10, 1985

INVENTOR(S) : Robert P. Hollaender, II, Leslie M. Howard and Ernest A. Hund

It is certified that error appears in the above-identified patent and that said Letters Patent is hereby corrected as shown below:

Col. 7  Line 33  "an outer and" should be --an outer end--

Signed and Sealed this

Nineteenth Day of November 1985

[SEAL]

Attest:

DONALD J. QUIGG

Attesting Officer

Commissioner of Patents and Trademarks